(12) United States Patent
Chen et al.

(10) Patent No.: US 11,094,229 B2
(45) Date of Patent: Aug. 17, 2021

(54) LIQUID CRYSTAL PANEL, DISPLAY, AND EXHIBITION DEVICE

(71) Applicant: HUIZHOU CHINA STAR OPTOELECTRONICS TECHNOLOGY CO., LTD., Huizhou Guangdong (CN)

(72) Inventors: Chunchi Chen, Huizhou Guangdong (CN); Yuchun Hsiao, Huizhou Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 643 days.

(21) Appl. No.: 15/777,839

(22) PCT Filed: Mar. 3, 2018

(86) PCT No.: PCT/CN2018/077944
§ 371 (c)(1),
(2) Date: May 21, 2018

(87) PCT Pub. No.: WO2019/153392
PCT Pub. Date: Aug. 15, 2019

(65) Prior Publication Data
US 2021/0082322 A1 Mar. 18, 2021

(30) Foreign Application Priority Data
Feb. 11, 2018 (CN) .......................... 201810142656.5

(51) Int. Cl.
*G09F 9/35* (2006.01)
*G02F 1/1335* (2006.01)

(52) U.S. Cl.
CPC .......... *G09F 9/35* (2013.01); *G02F 1/133514* (2013.01); *G02F 1/133528* (2013.01); *G02F 2201/52* (2013.01)

(58) Field of Classification Search
None
See application file for complete search history.

(56) References Cited

U.S. PATENT DOCUMENTS 7,948,584 B2 * 5/2011 Sugawara ......... G02F 1/133555
349/106
2014/0085578 A1 * 3/2014 Gu .......................... G02F 1/157
349/106

(Continued)

FOREIGN PATENT DOCUMENTS

CN 102914929 A 2/2013
CN 103487989 A 1/2014

(Continued)

*Primary Examiner* — Ryan Crockett
(74) *Attorney, Agent, or Firm* — Leong C. Lei

(57) ABSTRACT

A liquid crystal panel and a liquid crystal display are disclosed. The panel includes an array substrate, a filter substrate, and a liquid crystal layer. The filter substrate includes a filter sheet. The liquid crystal panel is partitioned into a transparent section and a color section, and the filter sheet includes a transparent photoresist corresponding to the transparent section, and a color photoresist corresponding to the color section. An exhibition device for showcasing products is also disclosed. The exhibition device includes a showcase, a lamp inside the showcase, and at least an above-described liquid crystal display and panel framed in one of the showcase's side wall. The lamp provides illumination to the transparent section and the showcased products may be viewed through the transparent section. The transparent section may also show static messages describing the showcased products. The color section presents dynamic messages demonstrating the showcased products.

14 Claims, 2 Drawing Sheets

(56) References Cited

U.S. PATENT DOCUMENTS

| | | | |
|---|---|---|---|
| 2015/0300599 A1* | 10/2015 | Lee | H01L 27/3218 349/61 |
| 2016/0012792 A1* | 1/2016 | Li | G02F 1/13363 345/92 |
| 2017/0059746 A1 | 3/2017 | Tung et al. | |
| 2017/0132962 A1* | 5/2017 | Tang | G09G 3/2003 |
| 2018/0190741 A1* | 7/2018 | Lou | H01L 51/5218 |
| 2018/0203316 A1* | 7/2018 | Xu | G02F 1/134336 |

FOREIGN PATENT DOCUMENTS

| | | |
|---|---|---|
| CN | 103543551 A | 1/2014 |
| CN | 103645582 A | 3/2014 |
| CN | 104051497 A | 9/2014 |
| CN | 205321904 U | 6/2016 |
| CN | 106054475 A | 10/2016 |
| CN | 106057843 A | 10/2016 |
| WO | 2016093633 A1 | 6/2016 |

* cited by examiner

LIQUID CRYSTAL PANEL, DISPLAY, AND EXHIBITION DEVICE

RELATED APPLICATIONS

The present application is a National Phase of International Application Number PCT/CN2018/077944, filed Mar. 3, 2018, and claims the priority of China Application No. 201810142656.5, filed Feb. 11, 2018.

BACKGROUND OF THE INVENTION (a) Technical Field of the Invention

The present invention is generally related to display technologies, and more particular to a liquid crystal panel, a liquid crystal display and an exhibition device incorporating the liquid crystal display.

(b) Description of the Prior Art

Various display technologies are continuously developed and commercialized. Among them, the transparent display technology receives wide acceptance due to its unique transparency and new applications relying on this unique property. Transparent display refers to a display capable of displaying images while the image behind the display is also viewable.

For various product marketing approaches, showcasing products in shop windows is the most common one. The products exhibited in the shop windows are always the one capturing shoppers' attention. Also showcased are the products' brands and their superior grades. Transparent displays therefore may be widely applied to shop windows of malls, department stores, etc., due to their transparency. Not only that the products behind the transparent displays are exhibited, but also that various product and stores messages, in texts, images, or videos, may be presented on the transparent displays dynamically. As such, through the showcase of the real products and the related messages, shoppers are offered complete information about the product, thereby enjoying more fulfilling shopping experience.

However, shoppers may view the shop windows from different heights or angles. Sometimes the displayed messages may be overlapped with the products behind, making them interfere with each other. Especially when the messages and the products have similar colors, or when the products have more vivid colors, the messages would hard to read, greatly affecting the exhibition effect.

SUMMARY OF THE INVENTION

To obviate the shortcomings of the existing technologies, the present invention provides a liquid crystal panel and display, and applies it to an exhibition device for showcasing products that can effectively resolve the problem of visual interference of transparent display and exhibited products.

To achieve the above objective, the present invention discloses the following solution.

A liquid crystal panel includes an array substrate, a filter substrate, and a liquid crystal layer, where the filter substrate includes a filter sheet, the liquid crystal panel is partitioned into a transparent section and a color section, and the filter sheet includes a transparent photoresist corresponding to the transparent section, and a color photoresist corresponding to the color section.

A number of first subpixels arranged in an array are configured in the transparent section, and a number of second subpixels arranged in an array are configured in the color section. Each first subpixel has an area larger than each second subpixel's area.

Preferably, each first subpixel has an area three to five times of each second subpixel's area.

The color photoresist includes sequentially arranged red, green, and blue color photoresists. A second subpixel corresponding to the red color photoresist becomes a red subpixel, a second subpixel corresponding to the green color photoresist becomes a green subpixel, and a second subpixel corresponding to the blue color photoresist becomes a blue subpixel.

The transparent section has an area large than the color section's area.

Preferably the transparent section has an area five to ten times of the color section's area.

Preferably the color section has a rectangular shape. The color section has a length identical to the transparent section's length. The transparent section has a width five to the times of the color section's width.

The present invention also discloses a liquid crystal display including the above described liquid crystal panel, a lower polarization sheet, an upper polarization sheet, and a backlight module. The lower polarization sheet is attached to the array substrate, the upper polarization sheet is attached to the filter substrate, and the backlight module is arranged behind the color section.

The backlight module is an edge lit backlight module or a direct lit backlight module.

The present invention further discloses an exhibition device for showcasing products. The exhibition device includes a showcase, a lamp inside the showcase, and at least an above-described liquid crystal display framed in one of the showcase's side wall. The lamp provides illumination to the transparent section and the showcased products may be viewed through the transparent section.

The disclosed liquid crystal panel includes a transparent section and a color section. People may see through the transparent section and view the showcased products. The transparent section may also show static messages, such as texts and graphical images, describing the showcased products. The color section presents dynamic messages, such as video clips, demonstrating the showcased products. By separating the liquid crystal panel into product-manifesting transparent section and video-playing color section, the prior art's visual interference problem of displayed messages overlapped with the products behind is effectively resolved or avoided.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
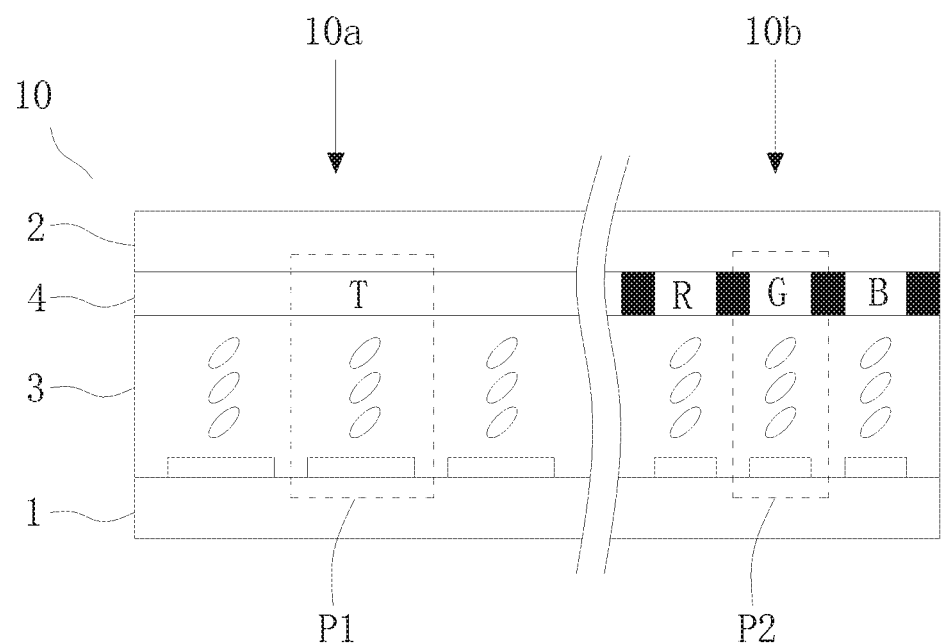
FIG. 1 is a sectional diagram showing a liquid crystal panel according to an embodiment of the present invention.
Figure 2:
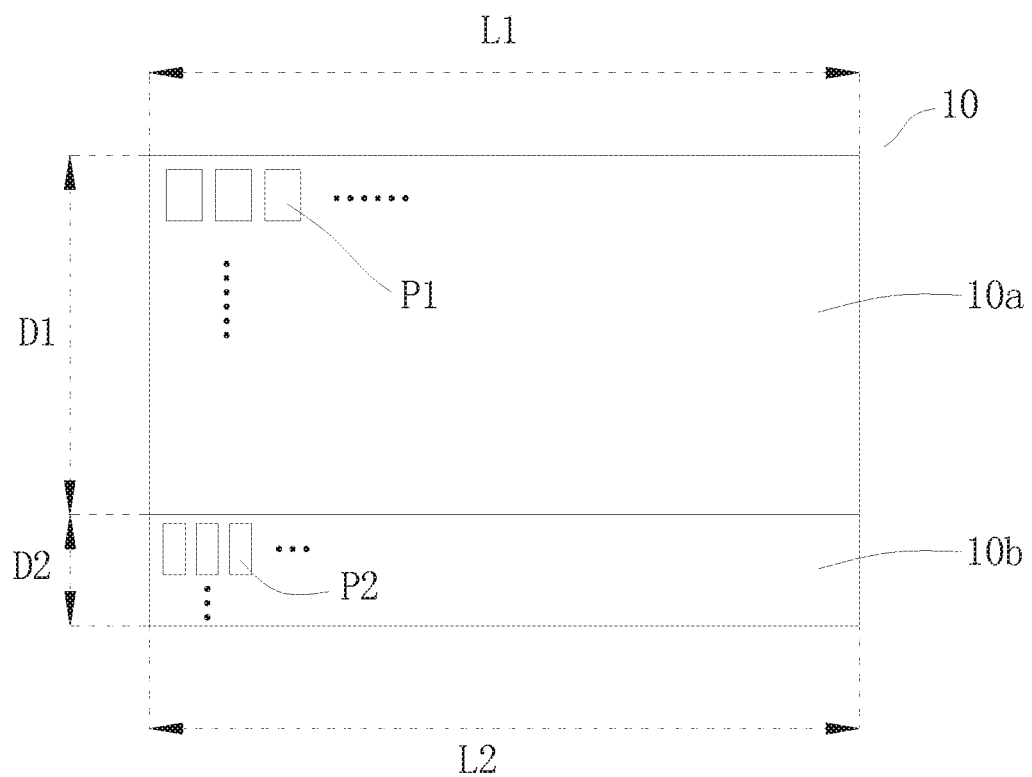
FIG. 2 is a planar structural diagram showing the liquid crystal panel of FIG. 1.

As shown in FIGS. 1 and 2, a liquid crystal panel 10 according to an embodiment of the present invention includes an array substrate 1, a filter substrate 2, and a liquid crystal layer 3. The array substrate 1 and the filter substrate 2 are arranged oppositely and the liquid crystal layer 3 is sandwiched between the array and filter substrates 1 and 2.

The array substrate 1 may be a thin film transistor (TFT) array substrate, upon which TFT transistors, gate lines, source lines, and pixel electrodes are provided. The filter substrate 3 includes a filter sheet 4 and common electrodes (not shown).

In the present embodiment, the liquid crystal panel 10 includes a transparent section 10a and a color section 10b. In other words, the liquid crystal panel 10 is partitioned into a transparent section 10a and a color section 10b. A number of first subpixels P1 arranged in an array are configured in the transparent section 10a, whereas a number of second subpixels P2 arranged in an array are configured in the color section 10b. The filter sheet 4 includes a transparent photoresist T corresponding to the transparent section 10a, and R, G, and B color photoresists corresponding to the color section 10b.

Specifically, for the transparent section 10a, the corresponding transparent photoresist T has a continuous planar structure. The transparent photoresist T correspond to the first subpixels P1. For the color section 10h, the R, G, and B color photoresists are arranged sequentially. Each of the R, G, and B color photoresists corresponds to a second subpixels P2, and the R, G, and B color photoresists are separated by a black matrix. The second subpixel P2 corresponding to the R color photoresist becomes the red subpixel, another second subpixel P2 corresponding to the G color photoresist becomes the green subpixel, and another second subpixel P2 corresponding to the B color photoresist becomes the blue subpixel.

For the liquid crystal panel 10 described above, objects exhibited behind the liquid crystal panel 10 may be viewed through the transparent section 10a. The transparent section 10a may also show static messages about the objects. These static messages include texts or graphical images. The color section 10b may show dynamic messages about the objects, such as video clips. By partitioning the liquid crystal panel 10 into the transparent section 10a and the color section 10b prevents the visual interference from dynamic messages overlapped with the objects behind. On the other hand, by integrating the transparent and color sections 10a and 10b together on the same liquid crystal panel 10 allow them to be driven by the same driving structure and chips, effectively saving costs.

In the present embodiment, as shown in FIG. 2, the area of each first subpixel P1 within the transparent section 10a is larger than the area of each second subpixel P2 within the color section 10b. Since the transparent section 10a are for seeing the objects behind and for showing static messages, its resolution may be lower than that of the color section 10b. Therefore, by increasing the area of each first subpixel P1, the aperture ratio of the first subpixel P1 is increased, and the light transmittance of the transparent section 10a is also increased. Preferably, the area of each first subpixel P1 is 3-5 times of the area of each second subpixel P2.

In the present embodiment, as shown in FIG. 2, the area of the transparent section 10a is larger than that of the color section 10b. Preferably, the area of the transparent section 10a is 5-10 times of the area of the color section 10b.

Specifically, in the present embodiment as shown in FIG. 2, the color section 10 has a rectangular shape. Its length L2 is the same as the length L1 of the transparent section 10a. Therefore, the transparent section 10a's width D1 is 5-10 times of the color section 10b's width D2. It should be noted that, in alternative embodiments, the color sections 10b may have different shapes.

In the present embodiment shown in FIG. 2, the transparent and color sections 10a and 10b are arranged in a vertical manner with the color section 10b joined to a bottom edge of the transparent section 10a. In alternative embodiments, the color section 10b may be joined to a top edge of the transparent section 10a, or the color aid transparent sections 10b and 10a may be arranged in a lateral manner. That is, the color section 10b is joined to a left or right edge of the transparent section 10a.

Figure 3:
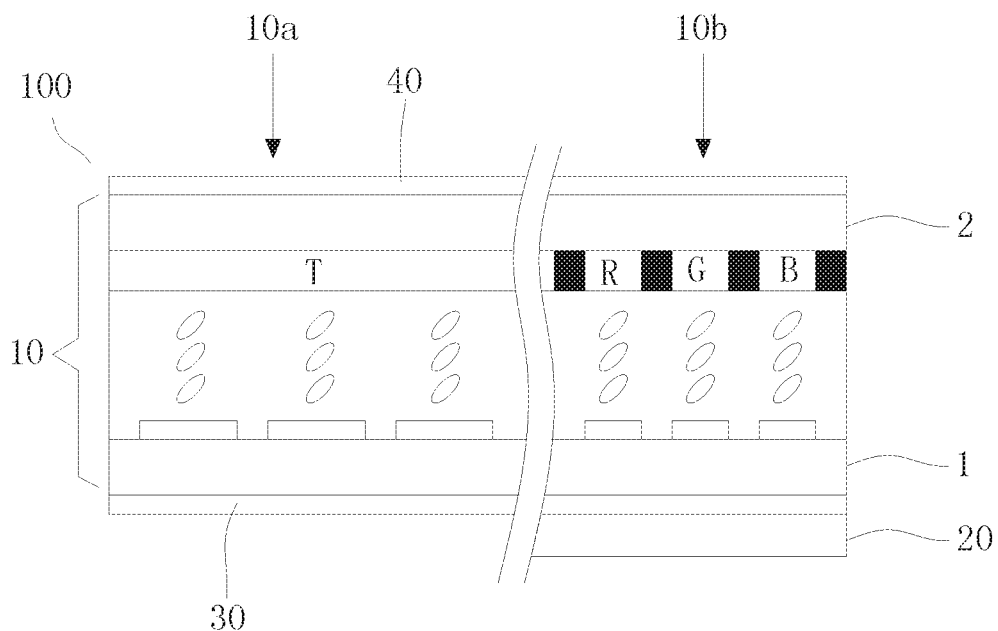
FIG. 3 is a sectional diagram showing a liquid crystal display according to an embodiment of the present invention.

The present invention also provides a liquid crystal display. As shown in FIG. 3, the liquid crystal display 100 according to an embodiment of the present invention includes a liquid crystal panel 10 described above, where a lower polarization sheet 30 is attached to a bottom of the array substrate 1, and an upper polarization sheet 40 is attached to a top side of the filter substrate 2. A backlight module 20 is arranged behind the color section 10b so as to provide illumination to the color section 10b. The backlight module 20 usually has LEDs as light source, and may be a direct lit backlight module or an edge lit backlight module.

The transparent section 10a of the liquid crystal panel 10 does not require a backlight module and, for illumination, relies on ambient light or other light source from the application environment of the liquid crystal display 100.

Figure 4:
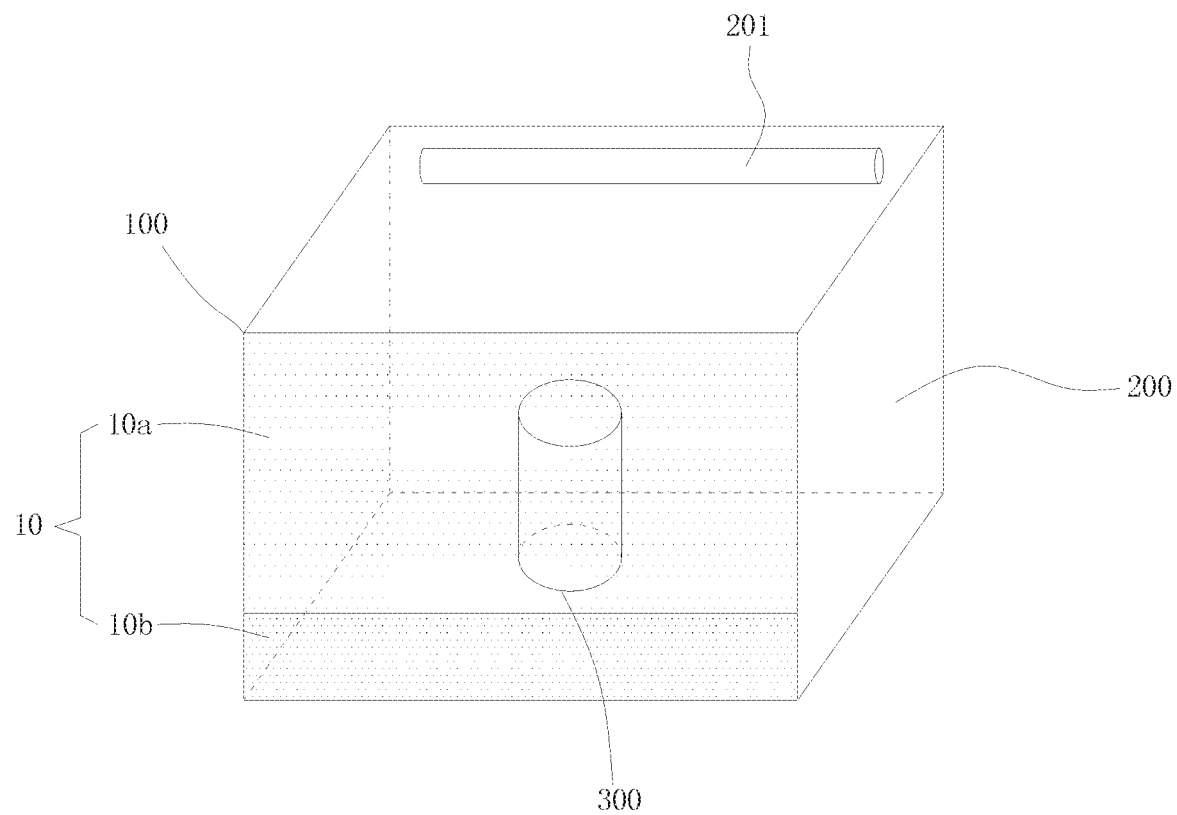
FIG. 4 is a perspective diagram showing an exhibition device according to an embodiment of the present invention.

The present invention further provides an exhibition device for showcasing products. As shown in FIG. 4, the exhibition device according to an embodiment of the present invention includes a showcase 200 to house a product 300 for exhibition. A lamp 201 is provided inside the showcase 200 for illuminating the product 300 so that it may be vividly viewed.

The exhibition device further includes a liquid crystal display 100 described above framed in at least a side wall of the showcase 200. The product 300 inside the showcase 200 may be seen through the transparent section 10a of the liquid crystal display panel 10 in the liquid crystal display 100. The transparent section 10a relies on the lamp 201 for illumination so as to present static messages such as texts and graphical images, for example, to provide introduction to the product 300. The color section 10b of the liquid crystal panel 10 provides dynamic messages such video clips for demonstrating the product 300.

With the liquid crystal display 100, the exhibition device described above displays the product 300 through the transparent section 10a while dynamic messages are presented simultaneously on the color section 10b. The separation of the transparent and color sections 10a and 10b reduces or even avoids the visual interference resulted from the messages overlapped with the showcased product, thereby achieving enhanced marketing effect.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A liquid crystal panel, comprising an array substrate, a filter substrate, and a liquid crystal layer, wherein
the filter substrate comprises a filter sheet;
the liquid crystal panel is partitioned to consist of a transparent section and a separate color section;
the color section and the transparent section are arranged in a vertical or lateral manner with the color section joined to an edge of the transparent section;
the transparent section has an area larger than the area of the color section;
a plurality of first subpixels are arranged in an array of a plurality of rows in the transparent section;
a plurality of second subpixels are arranged in an array of a plurality of rows in the color section;
each first subpixel has an area larger than the area of each second subpixel; and
the filter sheet comprises a transparent photoresist corresponding to the plurality of first subpixels in the transparent section, and a color photoresist corresponding to the plurality of second subpixels in the color section.

2. The liquid crystal panel according to claim 1, wherein each first subpixel has an area three to five times of the area of each second subpixel.

3. The liquid crystal panel according to claim 1, wherein the color photoresist comprises sequentially arranged red, green, and blue color photoresists; a second subpixel corresponding to the red color photoresist becomes a red subpixel; a second subpixel corresponding to the green color photoresist becomes a green subpixel, and a second subpixel corresponding to the blue color photoresist becomes a blue subpixel.

4. The liquid crystal panel according to claim 1, wherein the transparent section has an area five to ten times of the area of the color section.

5. The liquid crystal panel according to claim 1, wherein the color section has a rectangular shape; the color section has a length identical to the length of the transparent section; and the transparent section has a width five to ten times of the width of the color section.

6. A liquid crystal display, comprising a liquid crystal panel, a lower polarization sheet, an upper polarization sheet, and a backlight module; wherein
the liquid crystal panel comprises an array substrate, a filter substrate, and a liquid crystal layer;
the filter substrate comprises a filter sheet;
the liquid crystal panel is partitioned to consist of a transparent section and a separate color section;
the color section and the transparent section are arranged in a vertical or lateral manner with the color section joined to an edge of the transparent section;
the transparent section has an area larger than the area of the color section;
a plurality of first subpixels are arranged in an array of a plurality of rows in the transparent section;
a plurality of second subpixels are arranged in an array of a plurality of rows in the color section;
each first subpixel has an area larger than the area of each second subpixel;
the filter sheet comprises a transparent photoresist corresponding to the plurality of first subpixels in the transparent section, and a color photoresist corresponding to the plurality of second subpixels in the color section;
the lower polarization sheet is attached to the array substrate; the upper polarization sheet is attached to the filter substrate; and the backlight module is arranged behind the color section.

7. The liquid crystal display according to claim 6, wherein each first subpixel has an area three to five times of the area of each second subpixel.

8. The liquid crystal display according to claim 6, wherein the color photoresist comprises sequentially arranged red, green, and blue color photoresists; a second subpixel corresponding to the red color photoresist becomes a red subpixel; a second subpixel corresponding to the green color photoresist becomes a green subpixel, and a second subpixel corresponding to the blue color photoresist becomes a blue subpixel.

9. The liquid crystal display according to claim 6, wherein the transparent section has an area five to ten times of the area of the color section.

10. The liquid crystal display according to claim 6, wherein the color section has a rectangular shape; the color section has a length identical to the length of the transparent section; and the transparent section has a width five to ten times of the width of the color section.

11. An exhibition device, comprising a showcase, a lamp inside the showcase, and a liquid crystal display framed in at least a side wall of the showcase; wherein
the liquid crystal display comprises a liquid crystal panel, a lower polarization sheet, an upper polarization sheet, and a backlight module;
the liquid crystal panel comprises an array substrate, a filter substrate, and a liquid crystal layer;
the filter substrate comprises a filter sheet;
the liquid crystal panel is partitioned to consist of a transparent section and a separate color section;
the color section and the transparent section are arranged in a vertical or lateral manner with the color section joined to an edge of the transparent section;
the transparent section has an area larger than the area of the color section;
a plurality of first subpixels are arranged in an array of a plurality of rows in the transparent section;
a plurality of second subpixels are arranged in an array of a plurality of rows in the color section;
each first subpixel has an area larger than the area of each second subpixel;
the filter sheet comprises a transparent photoresist corresponding to the plurality of first subpixels in the transparent section, and a color photoresist corresponding to the plurality of second subpixels in the color section;

the lower polarization sheet is attached to the array substrate; the upper polarization sheet is attached to the filter substrate; the backlight module is arranged behind the color section; the lamp provides illumination to the transparent section; a product inside the showcase is viewable through the transparent section.

12. The exhibition device according to claim 11, wherein each first subpixel has an area three to five times of the area of each second subpixel.

13. The exhibition device according to claim 11, wherein the color photoresist comprises sequentially arranged red, green, and blue color photoresists; a second subpixel corresponding to the red color photoresist becomes a red subpixel; a second subpixel corresponding to the green color photoresist becomes a green subpixel, and a second subpixel corresponding to the blue color photoresist becomes a blue subpixel.

14. The exhibition device according to claim 11, wherein the transparent section has an area five to ten times of the area of the color section.

* * * * *